United States Patent
Yu et al.

(10) Patent No.: US 9,794,974 B2
(45) Date of Patent: Oct. 17, 2017

(54) MOBILITY MANAGEMENT FOR DEVICE-TO-DEVICE COMMUNICATIONS

(71) Applicant: Nokia Solutions and Networks Oy, Espoo (FI)

(72) Inventors: Ling Yu, Kauniainen (FI); Vinh Van Phan, Oulu (FI); Yang Liu, Beijing (CN); Hai Tao Li, Beijing (CN); Zexian Li, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/785,873

(22) PCT Filed: Apr. 24, 2013

(86) PCT No.: PCT/EP2013/058458
§ 371 (c)(1),
(2) Date: Oct. 21, 2015

(87) PCT Pub. No.: WO2014/173443
PCT Pub. Date: Oct. 30, 2014

(65) Prior Publication Data
US 2016/0157283 A1   Jun. 2, 2016

(51) Int. Cl.
*H04W 76/02* (2009.01)
*H04W 36/00* (2009.01)
(Continued)

(52) U.S. Cl.
CPC ......... *H04W 76/023* (2013.01); *H04W 4/005* (2013.01); *H04W 36/0033* (2013.01);
(Continued)

(58) Field of Classification Search
CPC . H04W 36/0055; H04W 4/005; H04W 36/30; H04W 36/36
(Continued)

(56) References Cited

U.S. PATENT DOCUMENTS

2012/0250498 A1   10/2012   Johansson et al. ........... 370/221

FOREIGN PATENT DOCUMENTS

WO   WO 2011/109027 A1   9/2011
WO   WO 2011/147462 A1   12/2011
(Continued)

OTHER PUBLICATIONS

3GPP TR 22.803 V12.1.0 (Mar. 2013), "$3^{rd}$ Generation Partnership Project; Technical Specification Group Services and System Aspects; Feasibility study for Proximity Services (ProSe) (Release 12)", 45 pgs.
(Continued)

*Primary Examiner* — Sam Bhattacharya
(74) *Attorney, Agent, or Firm* — Harrington & Smith

(57) ABSTRACT

There are provided measures for mobility management for device-to-device communications. Such measures exemplarily include receiving a radio handover request message indicating that a radio handover of at least one communication endpoint utilizing device-to-device communication is to be hidden from core network, and determining, based on device-to-device context information, which is information on said device-to-device communication, and/or on information on said at least one communication endpoint, whether a notification of said radio handover is to be transmitted.

29 Claims, 9 Drawing Sheets

(51) Int. Cl.
    *H04W 4/00*     (2009.01)
    *H04W 36/30*     (2009.01)
    *H04W 36/36*     (2009.01)
    *H04W 76/04*     (2009.01)

(52) U.S. Cl.
    CPC ... *H04W 36/0055* (2013.01); *H04W 36/0061* (2013.01); *H04W 36/30* (2013.01); *H04W 36/36* (2013.01); *H04W 76/046* (2013.01); *H04W 76/043* (2013.01)

(58) Field of Classification Search
    USPC .................................................. 455/436–442
    See application file for complete search history.

(56) References Cited

FOREIGN PATENT DOCUMENTS

| | | |
|---|---|---|
| WO | WO 2013/055271 A1 | 4/2013 |
| WO | WO 2013/177185 A2 | 11/2013 |
| WO | WO 2014/117858 A1 | 8/2014 |

OTHER PUBLICATIONS

Raghothaman, Balaji, et al., "Architecture and Protocols for LTE-based Device to Device Communication", © 2013 IEEE, 5 pgs.

MOBILITY MANAGEMENT FOR DEVICE-TO-DEVICE COMMUNICATIONS

FIELD

The present invention relates to mobility management for device-to-device communications. More specifically, the present invention exemplarily relates to measures (including methods, apparatuses and computer program products) for realizing mobility management for device-to-device communications.

BACKGROUND

The present specification generally relates to network controlled device-to-device (D2D) communications scenarios. In view of the $3^{rd}$ Generation Partnership Project (3GPP) mobile network technology Long Term Evolution Advanced (LTE-A) Rel-12, the present specification in particular addresses LTE-A support for network-controlled D2D communications. Network controlled D2D communications include, for example, direct communications in a cluster of proximity devices, and optimized data path via eNB(s) in cellular network.

Since D2D may provide the opportunity to relieve certain network elements from part of traffic load, D2D related topics are under discussion within 3GPP and also are also of high interest of different network operators.

In this specification, in particular D2D communications with optimized data path (known as locally routed data path in 3GPP TR22.803) and direct data path mode are considered. D2D communications with optimized data path can be seen as communications between two terminals (e.g. user equipment (UE)) via the respective serving access nodes (e.g. evolved Node B (eNB)) without routing the data path via gateways (e.g. serving gateway (S-GW), packet data network gateway (P-GW)) of the respective operator network. D2D communications with direct data path can be seen as communications between two terminals directly, i.e. without routing the data path via the respective serving access nodes and/or gateways of the respective operator network. It is noted that the above description only mentions the data path, while the control path may nevertheless involve the respective serving access nodes and/or gateways of the respective operator network. In 3GPP TR22.803, a detailed description of different D2D communication modes in relation to data path and control path is given.

For D2D communication with optimized data path and direct data path mode in a network controlled way, i.e., involving the respective serving access nodes and/or gateways of the respective operator network for the control path, mobility procedure could happen to either or both of the D2D pair of UEs (a pair of UEs utilizing D2D communication with each other). For example, one of the D2D pair (or both of the D2D UEs) is/are moving into the coverage of an adjacent eNB, and a radio handover of one of the D2D pair (or both of the D2D UEs) occurs. According to 3GPP TR22.803, in such case the D2D service continuity is to be guaranteed as much as possible to provide good user experience. During the radio handover procedure, if conventional evolved packed system (EPS) service is also ongoing, the radio handover procedure involves mobility management entity (MME)/core network (CN) for path switching, security key updating, and so on.

However in case no EPS service is associated with the D2D pair, it may be possible that this D2D pair is in RRC_Connected state while MME/CN is in ECM_IDLE state (which means that RRC_Connected state is maintained for D2D service only). Hence when mobility happens to the D2D pair (i.e. one or both UEs are handed over), the core network node, for example MME/D2D registration server function (DRSF) is sometimes not immediately needed to be involved for radio handover procedures.

In sum, for a D2D service via optimized path and direct path between two UEs it may be possible that only D2D service is ongoing but no EPS service is active. In this case the D2D pair of UEs is in RRC_Connected state and seen in ECM_IDLE state seen by MME/CN.

Hence, the problem arises that in view of lack of necessity of involvement of the CN in radio handover procedures in certain situations, such involvement is to be minimized as much as possible during the D2D pair mobility. In particular, radio handover procedures in case of mobility of D2D communicating UEs at radio access network (RAN) level are to be defined. More specifically, radio handover procedures for optimized path and direct path D2D UE are to be defined.

Hence, there is a need to provide for mobility management for device-to-device communications.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving a radio handover request message indicating that a radio handover of at least one communication endpoint utilizing device-to-device communication is to be hidden from core network, and determining, based on device-to-device context information, which is information on said device-to-device communication, and/or on information on said at least one communication endpoint, whether a notification of said radio handover is to be transmitted.

According to an exemplary aspect of the present invention, there is provided a method comprising providing at least one communication endpoint utilizing device-to-device communication with enhanced neighbor cell list information, wherein said enhanced neighbor cell list information comprises a neighbor cell list listing neighbor cells, and information regarding X2 interface availability with each of said neighbor cells.

According to an exemplary aspect of the present invention, there is provided a method comprising executing device-to-device communication with a communication endpoint, receiving a result of reception measurement of said neighbor cell by said communication endpoint, measuring said reception of said neighbor cell, and deciding to initiate a radio handover to said neighbor cell based on a result of said measuring and said received result, if a X2 interface is not available between a serving cell and said neighbor cell.

According to an exemplary aspect of the present invention, there is provided an apparatus comprising receiving means configured to receive a radio handover request message indicating that a radio handover of at least one communication endpoint utilizing device-to-device communication is to be hidden from core network, and determining means configured to determine, based on device-to-device context information, which is information on said device-to-device communication, and/or on information on said at least one communication endpoint, whether a notification of said radio handover is to be transmitted.

According to an exemplary aspect of the present invention, there is provided an apparatus comprising providing means configured to provide at least one communication endpoint utilizing device-to-device communication with enhanced neighbor cell list information, wherein said enhanced neighbor cell list information comprises a neighbor cell list listing neighbor cells, and information regarding X2 interface availability with each of said neighbor cells.

According to an exemplary aspect of the present invention, there is provided an apparatus comprising executing means configured to execute device-to-device communication with a communication endpoint, receiving means configured to receive a result of reception measurement of said neighbor cell by said communication endpoint, measuring means configured to measure said reception of said neighbor cell, and deciding means configured to decide to initiate a radio handover to said neighbor cell based on a result of said measuring means and said received result, if a X2 interface is not available between a serving cell and said neighbor cell.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient relieving burden from parts of the core network in certain situations to thereby solve at least part of the problems and drawbacks identified in relation to the prior art.

By way of exemplary embodiments of the present invention, there is provided mobility management for device-to-device communications. More specifically, by way of exemplary embodiments of the present invention, there are provided measures and mechanisms for realizing mobility management for device-to-device communications.

Thus, improvement is achieved by methods, apparatuses and computer program products enabling/realizing mobility management for device-to-device communications.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
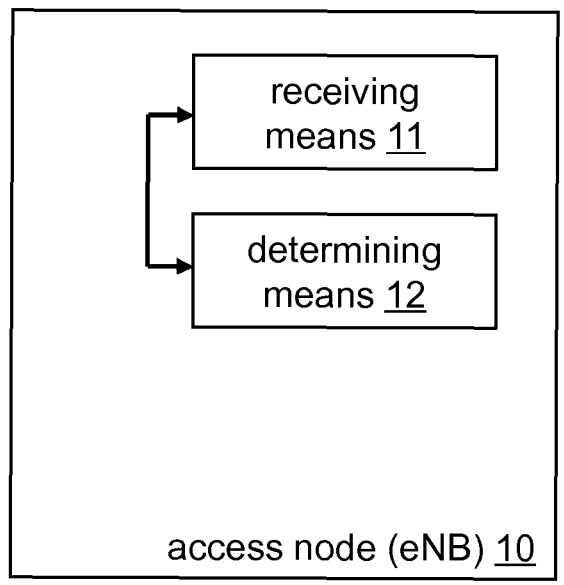
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, D2D communication and D2D communication related control signaling is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) mobility management for device-to-device communications.

According to exemplary embodiments of the present invention, radio handover procedures in case of mobility of D2D communicating UEs at radio access network (RAN) level, in particular, radio handover procedures for optimized path and direct path D2D UE without conventional EPS service involved are defined.

According to exemplary embodiments of the present invention a new type of radio handover in LTE is proposed which happens only in RAN level without involvement of MME/CN side. Due to some concerns e.g. security, charging, and so on, it might however be necessary to involve the CN in the radio handover procedure, i.e. the mobility procedure for a D2D pair may not be hidden from CN all the time.

It is thus necessary to manage the D2D UE mobility/handover in optimized path and direct path considering the above mentioned concerns to support UE mobility in order to keep MME/DRSF aware of the ongoing situation if necessary and to minimize the CN involvement as much as possible during the D2D pair mobility. Hence, according to exemplary embodiments of the present invention, a diving handover is proposed considering the above. Diving handover according to exemplary embodiments of the present invention means that the mobility is hidden from CN.

According to exemplary embodiments of the present invention, a diving handover scheme initiated by either network side or UE side in an adaptive controlled fashion is proposed to support mobility of optimized path and direct path D2D UEs without ongoing conventional EPS service (i.e., UEs being in optimized path D2D or direct path D2D, are assumed to be in RRC_Connected state but ECM_IDLE state).

The mobility procedure according to exemplary embodiments of the present invention may be implemented between two adjacent eNBs with or without X2 interface (therebetween). According to exemplary embodiments of the present invention, after the radio handover is finished (or during radio handover preparation), the target eNB may choose not to inform MME based on the D2D context information. Hence, the RAN-level mobility of D2D UEs remains hidden from CN side if there is no need for reactivation of EPS service. According to exemplary embodiments of the present invention, otherwise, the target eNB may initiate a notification to MME/DRSF on demand to update D2D context information for the D2D pair.

Furthermore, according to exemplary embodiments of the present invention, both network side and UE side may be configured such that, among others, if X2 interface between the source and target eNBs is available, then a network-initiated handover may be applied, and otherwise, if X2 interface between the source and target eNBs is not available, UE-initiated handover may be applied. There could be different ways for UE to know the existence of X2, e.g. receipt of broadcast or unicast message.

Figure 7:
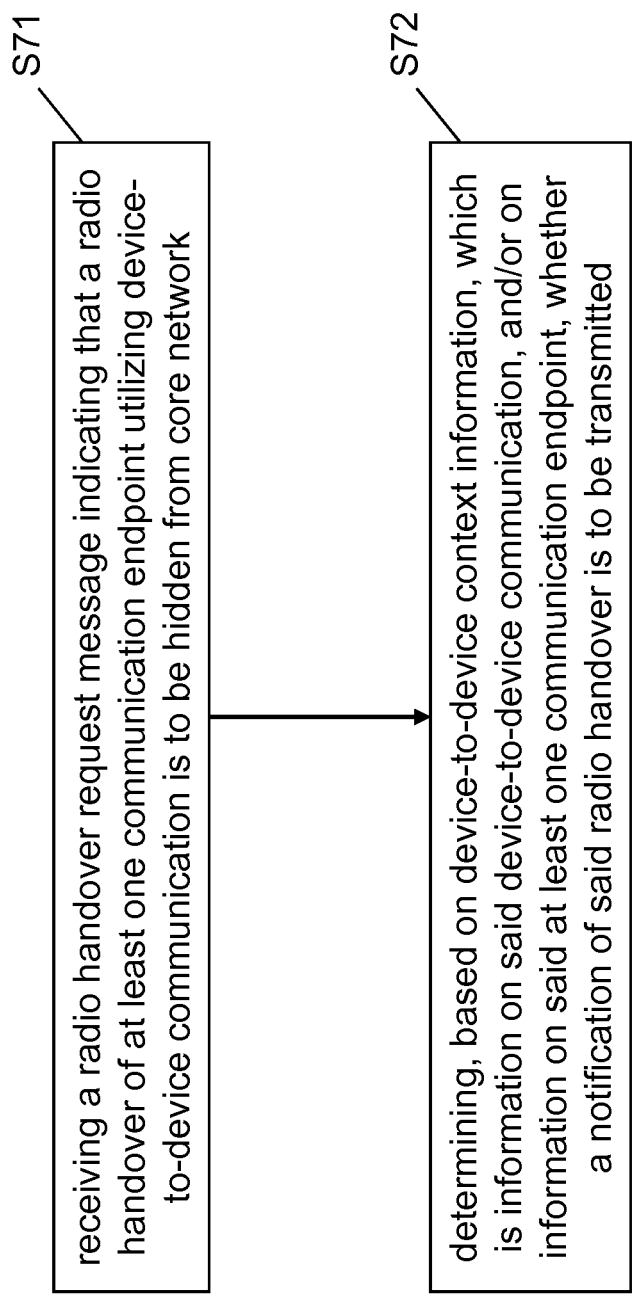
FIG. 7 is a schematic diagram of a procedure according to exemplary embodiments of the present invention.

FIG. 1 is a block diagram illustrating an apparatus according to exemplary embodiments of the present invention. The apparatus may be an access node 10 such as a base station comprising a receiving means 11 and a determining means 12. The receiving means 11 receives a radio handover request message indicating that a radio handover of at least one communication endpoint utilizing device-to-device communication is to be hidden from core network. The determining means 12 determines, based on device-to-device context information, which is information on said device-to-device communication, and/or on information on said at least one communication endpoint, whether a notification of said radio handover is to be transmitted. FIG. 7 is a schematic diagram of a procedure according to exemplary embodiments of the present invention. The apparatus according to FIG. 1 may perform the method of FIG. 7 but is not limited to this method. The method of FIG. 7 may be performed by the apparatus of FIG. 1 but is not limited to being performed by this apparatus.

As shown in FIG. 7, a procedure according to exemplary embodiments of the present invention comprises an operation of receiving (S71) a radio handover request message indicating that a radio handover of at least one communication endpoint utilizing device-to-device communication is to be hidden from core network, and an operation of determining (S72) means configured to determine, based on device-to-device context information, which is information on said device-to-device communication, and/or based on information on said at least one communication endpoint, whether a notification of said radio handover is to be transmitted.

According to exemplary embodiments of the present invention, in step S72 it may be determined whether the notification of said radio handover is to be transmitted to the core network (e.g. to the MME, the DRSF, the home subscriber server (HSS), the S-GW, the P-GW, or the policy and charging rules function (PCRF) server).

According to a variation of the procedure shown in FIG. 7, exemplary additional operations are given, which are inherently independent from each other as such. According to such variation, an exemplary method according to exemplary embodiments of the present invention may comprise an operation of enabling, upon affirmative result of said determining (i.e. that a notification of said radio handover is to be transmitted), transmission of a device-to-device information update request message indicative of said radio handover, and an operation of disabling, upon negative result of said determining (i.e. that a notification of said radio handover is not to be transmitted), said transmission of said device-to-device information update request message indicative of said radio handover.

According to a variation of the procedure shown in FIG. 7, in particular in relation to said determining, said notification of said radio handover may be not to be transmitted, if at least the following criteria is met: a device-to-device registration area of said at least one communication endpoint has not changed, said at least one communication endpoint can be identified, and no involvement of a core network is needed in a security/ciphering key update for said at least one communication endpoint.

According to exemplary embodiments of the present invention, device-to-device context information may comprise at least one of a device-to-device pair identifier, a X2 application protocol identifier, a device-to-device service bearer list, and device-to-device location registration information.

Figure 2:
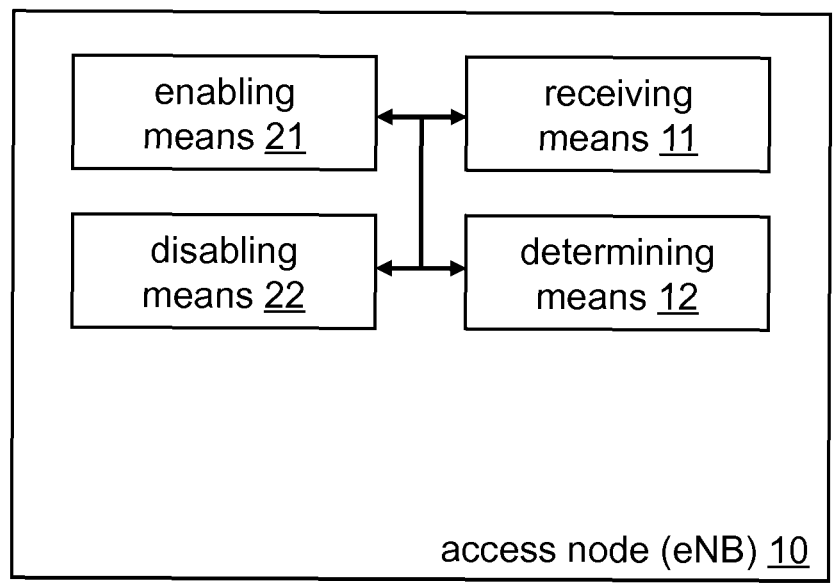
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise enabling means 21 and disabling means 22.

Figure 3:
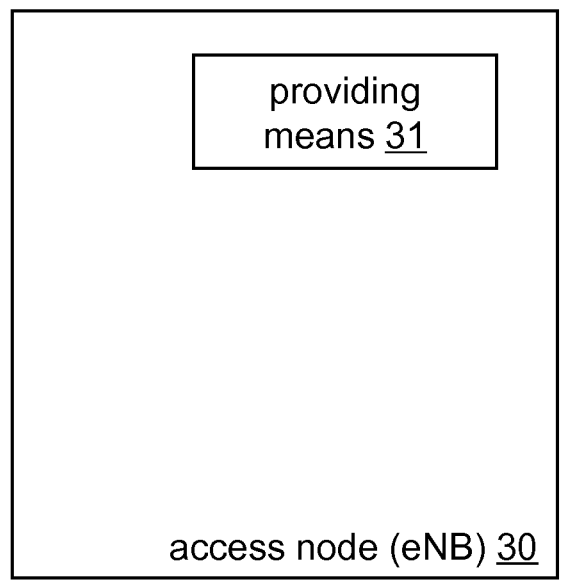
FIG. 3 is a block diagram illustrating an apparatus according to exemplary embodiments of the present invention.
Figure 8:
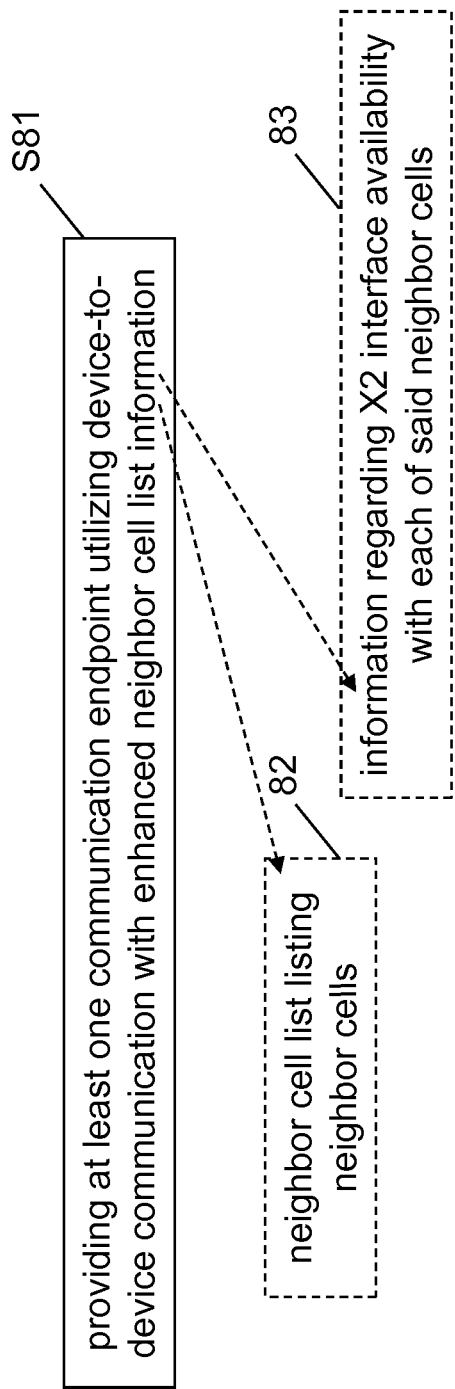
FIG. 8 is a schematic diagram of a procedure according to exemplary embodiments of the present invention.

FIG. 3 is a block diagram illustrating an apparatus according to exemplary embodiments of the present invention. The apparatus may be an access node 30 such as a base station comprising providing means 31. The providing means 31 provides at least one communication endpoint utilizing device-to-device communication with enhanced neighbor cell list information, wherein said enhanced neighbor cell list information may comprise at least one of a neighbor cell list listing neighbor cells, and information regarding X2 interface availability with each of said neighbor cells. FIG. 8 is a schematic diagram of a procedure according to exemplary embodiments of the present invention. The apparatus according to FIG. 3 may perform the method of FIG. 8 but is not limited to this method. The method of FIG. 8 may be performed by the apparatus of FIG. 3 but is not limited to being performed by this apparatus.

As shown in FIG. 8, a procedure according to exemplary embodiments of the present invention comprises an operation of providing (S81) at least one communication endpoint utilizing device-to-device communication with enhanced neighbor cell list information, wherein said enhanced neighbor cell list information may comprise at least one of a neighbor cell list listing neighbor cells 82, and information regarding X2 interface availability with each of said neighbor cells 83.

According to a variation of the procedure shown in FIG. 8, exemplary details of the providing operation are given, which are inherently independent from each other as such.

Such exemplary providing operation according to exemplary embodiments of the present invention may comprise an operation of transmitting said enhanced neighbor cell list information via at least one of a system information broadcast and a dedicated control signaling.

Figure 4:
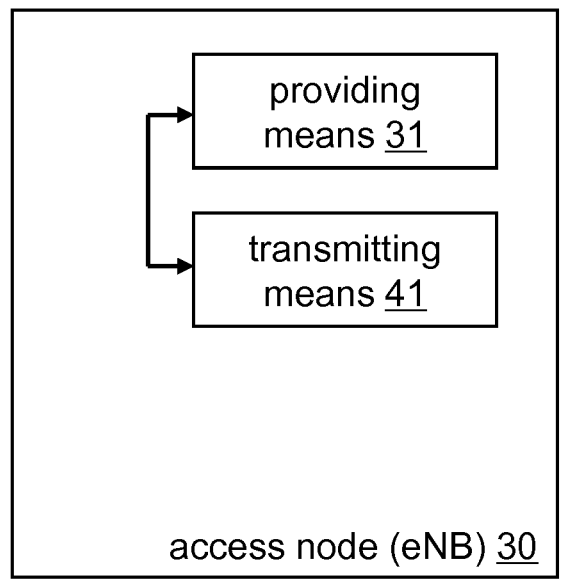
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise transmitting means 41.

Figure 5:
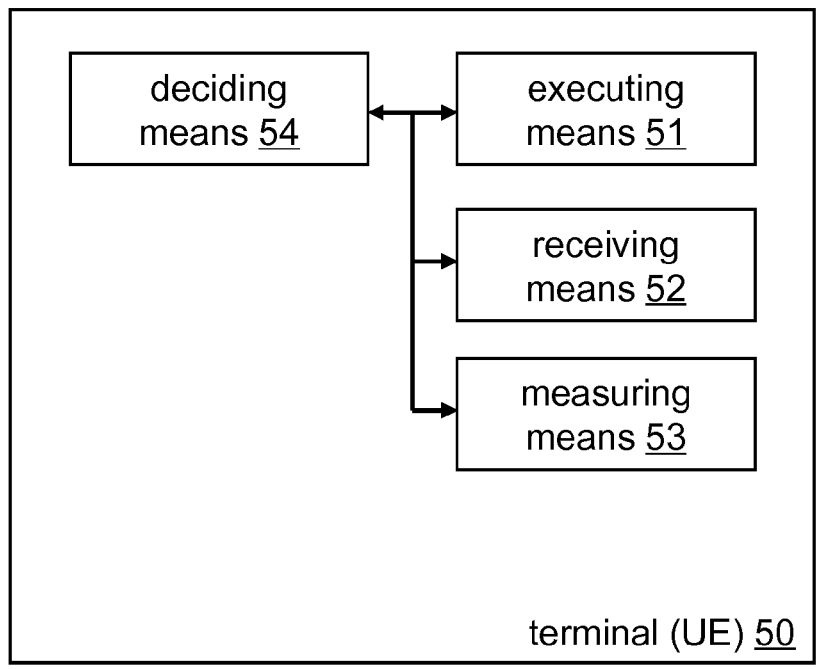
FIG. 5 is a block diagram illustrating an apparatus according to exemplary embodiments of the present invention.
Figure 9:
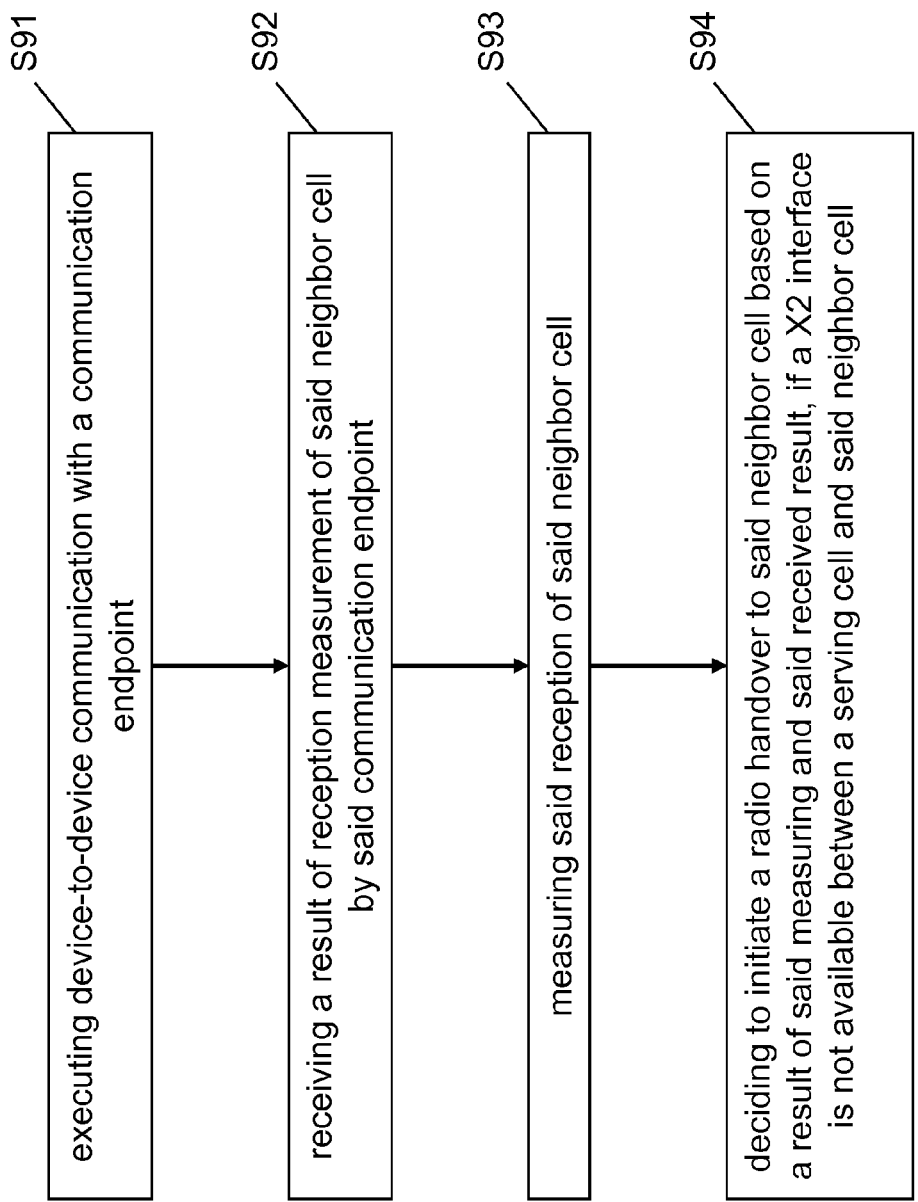
FIG. 9 is a schematic diagram of a procedure according to exemplary embodiments of the present invention.

FIG. 5 is a block diagram illustrating an apparatus according to exemplary embodiments of the present invention. The apparatus may be a terminal 50 such as a user equipment and may comprise executing means 51, receiving means 52, measuring means 53, and deciding means 54. The executing means 51 may execute device-to-device communication with a communication endpoint. The receiving means 52 may receive a result of reception measurement of said neighbor cell by said communication endpoint. The measuring means 53 may measure said reception of said neighbor cell, and the deciding means 54 may decide to initiate a radio handover to said neighbor cell based on a result of said measuring means 53 and said received result, if a X2 interface is not available between a serving cell and said neighbor cell. FIG. 9 is a schematic diagram of a procedure according to exemplary embodiments of the present invention. The apparatus according to FIG. 5 may perform the method of FIG. 9 but is not limited to this method. The method of FIG. 9 may be performed by the apparatus of FIG. 5 but is not limited to being performed by this apparatus.

As shown in FIG. 9, a procedure according to exemplary embodiments of the present invention may comprise an operation of executing (S91) device-to-device communication with a communication endpoint, an operation of receiving (S92) a result of reception measurement of said neighbor cell by said communication endpoint, an operation of measuring (S93) said reception of said neighbor cell, and an operation of deciding (S94) to initiate a radio handover to said neighbor cell based on a result of said measuring and said received result, if a X2 interface is not available between a serving cell and said neighbor cell.

According to a variation of the procedure shown in FIG. 9, exemplary additional operations are given, which are inherently independent from each other as such. According to such variation, an exemplary method according to exemplary embodiments of the present invention may comprise an operation of obtaining enhanced neighbor cell list information from said serving cell, wherein said enhanced neighbor cell list information comprises a neighbor cell list listing neighbor cells of said serving cell, and information regarding X2 interface availability of said serving cell with each of said neighbor cells.

According to a variation of the procedure shown in FIG. 9, exemplary details of the obtaining operation are given, which are inherently independent from each other as such. Such exemplary obtaining operation according to exemplary embodiments of the present invention may comprise an operation of receiving said enhanced neighbor cell list information via at least one of a system information broadcast and a dedicated control signaling.

According to a variation of the procedure shown in FIG. 9, exemplary additional operations are given, which are inherently independent from each other as such. According to such variation, an exemplary method according to exemplary embodiments of the present invention may comprise an operation of determining, based on said enhanced neighbor cell list information, whether an X2 interface is available between said serving cell and said neighbor cell.

According to a variation of the procedure shown in FIG. 9, exemplary additional operations are given, which are inherently independent from each other as such. According to such variation, an exemplary method according to exemplary embodiments of the present invention may comprise an operation of transmitting, upon affirmative result of said deciding (to initiate a radio handover to said neighbor cell), a radio handover request message to said target neighbor cell, said radio handover request message may comprise at least one of an own radio handover request, a radio handover request for said communication endpoint, and information on a direct device-to-device link of said device-to-device communication.

According to exemplary embodiments of the present invention, the radio handover request message is indicative of that said radio handover is to be hidden from a core network.

According to a variation of the procedure shown in FIG. 9, exemplary additional operations are given, which are inherently independent from each other as such. According to such variation, an exemplary method according to exemplary embodiments of the present invention may comprise an operation of transmitting a device-to-device radio resource control related handover decision indication message, wherein said device-to-device radio resource control related handover decision indication message indicates an initiated radio handover to said target neighbor cell.

According to a variation of the procedure shown in FIG. 9, exemplary additional operations are given, which are inherently independent from each other as such. According to such variation, an exemplary method according to exemplary embodiments of the present invention may comprise an operation of receiving, from said target neighbor cell, as a response to said radio handover request message, a radio handover response message which may comprise at least one of a radio handover command to be considered and a radio handover command for said communication endpoint, and an operation of transmitting a device-to-device radio resource control related message, for example RRCConnectionReconfiguration message, comprising said radio handover command for said communication endpoint.

According to a variation of the procedure shown in FIG. 9, exemplary additional operations are given, which are inherently independent from each other as such. According to such variation, an exemplary method according to exemplary embodiments of the present invention may comprise an operation of receiving a device-to-device radio resource control related handover decision indication message indicating initiated radio handover to said neighbor cell, and an operation of transmitting, to said serving cell, a handover decision indication message indicating initiated radio handover to said target neighbor cell, if said X2 interface is not available between said serving cell and said neighbor cell.

According to a variation of the procedure shown in FIG. 9, exemplary additional operations are given, which are inherently independent from each other as such. According to such variation, an exemplary method according to exemplary embodiments of the present invention may comprise an operation of transmitting a context release request message requesting context release for oneself and said communication endpoint.

Figure 6:
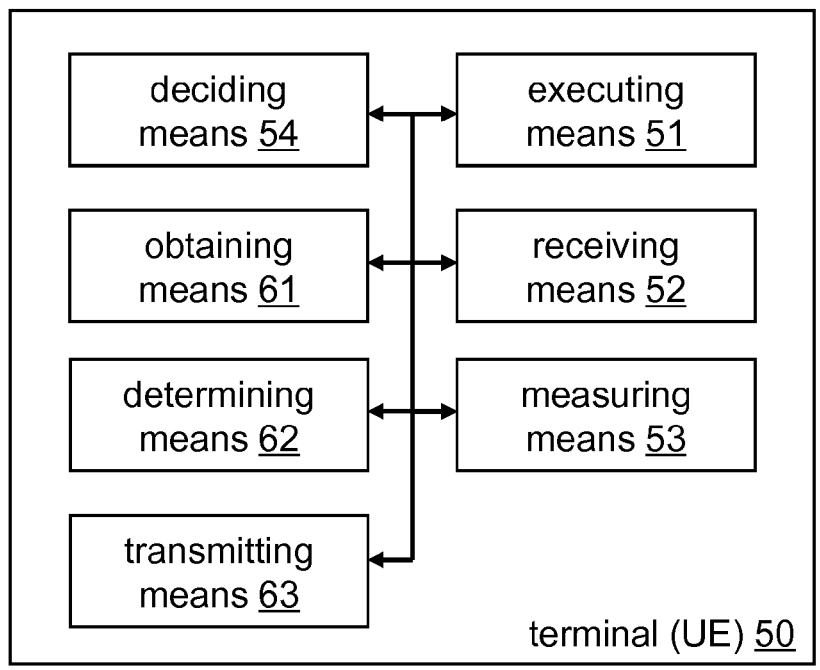
FIG. 6 is a block diagram illustrating an apparatus according to exemplary embodiments of the present invention.

FIG. 6 is a block diagram illustrating an apparatus according to exemplary embodiments of the present invention. In particular, FIG. 6 illustrates a variation of the apparatus shown in FIG. 5. The apparatus according to FIG. 6 may thus further comprise obtaining means 61, determining means 62, and transmitting means 63.

Hence, according to exemplary embodiments of the present invention, following exemplary diving radio handover procedures may be implemented.

Figure 10:
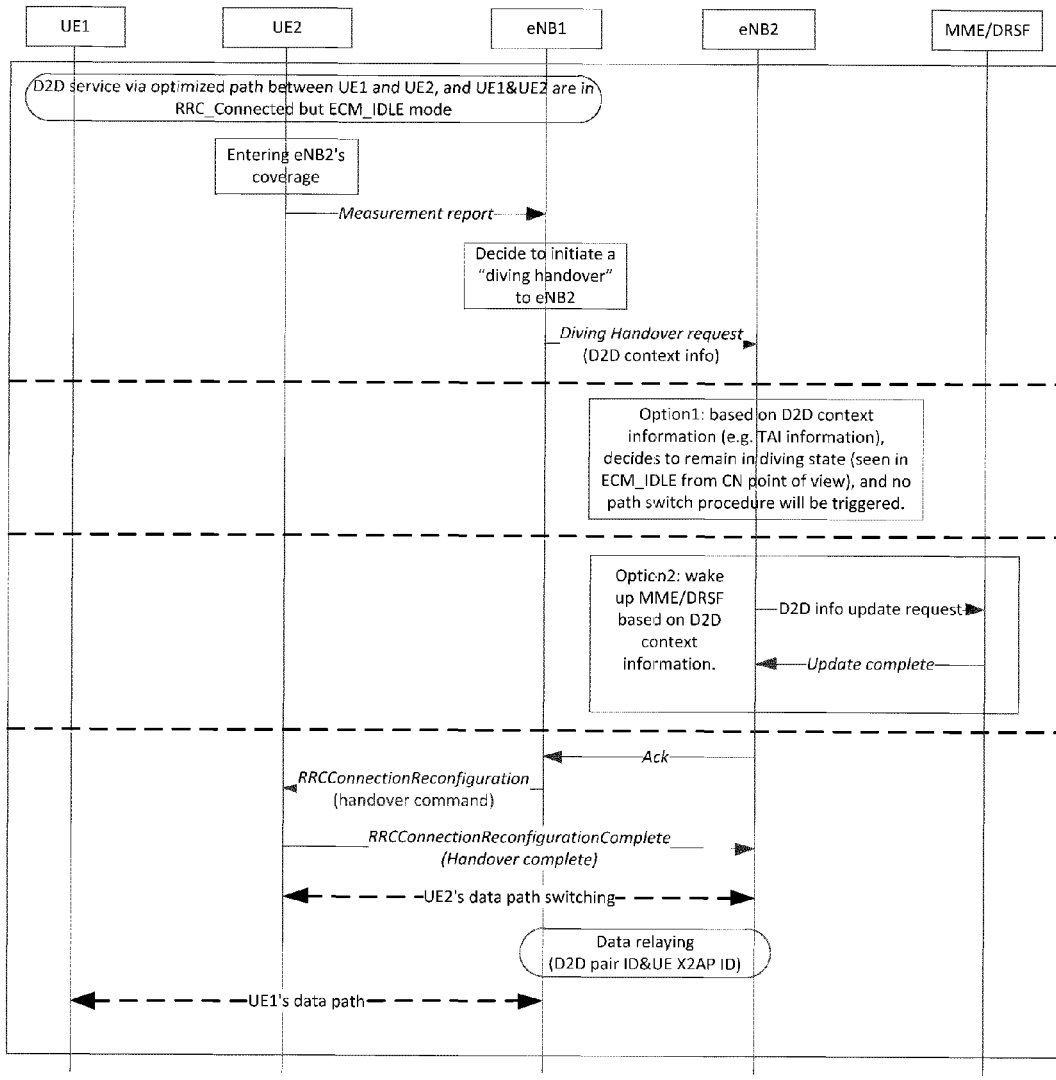
FIG. 10 is a schematic diagram of a network initiated diving handover procedure for optimized data path D2D according to exemplary embodiments of the present invention.

FIG. 10 is a schematic diagram of a network initiated diving handover procedure for optimized data path in D2D communication according to exemplary embodiments of the present invention.

According to the exemplary radio handover procedure illustrated in FIG. 10, a D2D service between UE1 and UE2 is ongoing via exemplary eNB1, i.e. an optimized D2D path is assumed between the D2D pairs and exemplary UE1 and UE2 are both in RRC_Connected but ECM_IDLE mode. Upon movement of for example UE2, UE2 may enter the coverage of exemplary eNB2. Upon entering, a measurement procedure is triggered, in which reception of the cell served by eNB2 is measured. It is noted that no EPS service is activated during the whole procedure.

The eNB1 detects that a handover is needed for UE2 based on measurement report which was sent by the UE2 to the eNB1. A diving handover (diving handover according to exemplary embodiments of the present invention means that the mobility is hidden from CN) request message is sent from eNB1 to eNB2, which may contain the D2D context of the D2D pair, e.g. (including but not restricted in) a D2D pair ID, an eNB UE X2AP ID, a D2D service bearer list, and/or a D2D location registration information. The handover request may further contain restricted public land mobile network (PLMN) information for the involved UEs.

The diving handover request message according to exemplary embodiments of the present invention is targeted for D2D bearers only and does not contain any conventional EPS bearer related information.

When eNB2 receives the diving handover request message from (source) eNB1, (target) eNB2 makes a decision based on D2D context information of UE2 (e.g. based on the D2D location registration information).

Namely, if it is not required to inform MME/DRSF, then no notification message (like path switch) is sent to MME/DRSF. Accordingly, the handover procedure will be hidden from the core network side.

Even if there is a need to update the ciphering keys for D2D service in optimized path, the related neighboring eNBs may be able to derive the new D2D ciphering key for the D2D pair without core network involvement, wherein coordination between eNB1 and eNB2 is needed to complete the key update procedures.

On the other hand, if there are certain reasons to indicate this mobility (related to the radio handover) to MME/DRSF, a notification message is sent to MME/DRSF. For example, if UE2 is moving into a new D2D registration area, the location information may be updated to MME/DRSF. As a further example, if the DRSF needs to be informed for the sake of authentication, charging policy modifications, and so on, then a D2D context information update procedure may be invoked accordingly between target eNB2 and MME/DRSF. If the handover request contains PLMN information for the involved UEs and those information yield that a roaming case is met, the CN may be involved to deal with roaming issues regarding the involved UEs.

As a following step of the exemplary diving radio handover procedure, eNB2 accepts the diving handover request and sends acknowledgment (ACK) to eNB1. Subsequently, a radio handover is initiated to hand over UE2 to eNB2. Incidentally, the related data path for D2D service transmission is also updated from "UE2⇔eNB1⇔UE1" to "UE2⇔eNB2⇔eNB1⇔UE1". The X2 interface between eNB2 and eNB1 may utilize D2D pair ID together with eNB UE X2AP ID to identify each D2D pair flow.

During this exemplary diving handover procedure according to exemplary embodiments of the present invention, the D2D service continuity can be guaranteed. D2D context information may be transferred with related UE in network side. The respective context information may be important for target eNB (eNB2) to determine whether to wake up the MME/DRSF on demand, based on different requirements defined for optimized path D2D service.

Consequently, after the handover, UE2 is switching to eNB2, while UE1 remains connected with eNB1.

Figure 11:
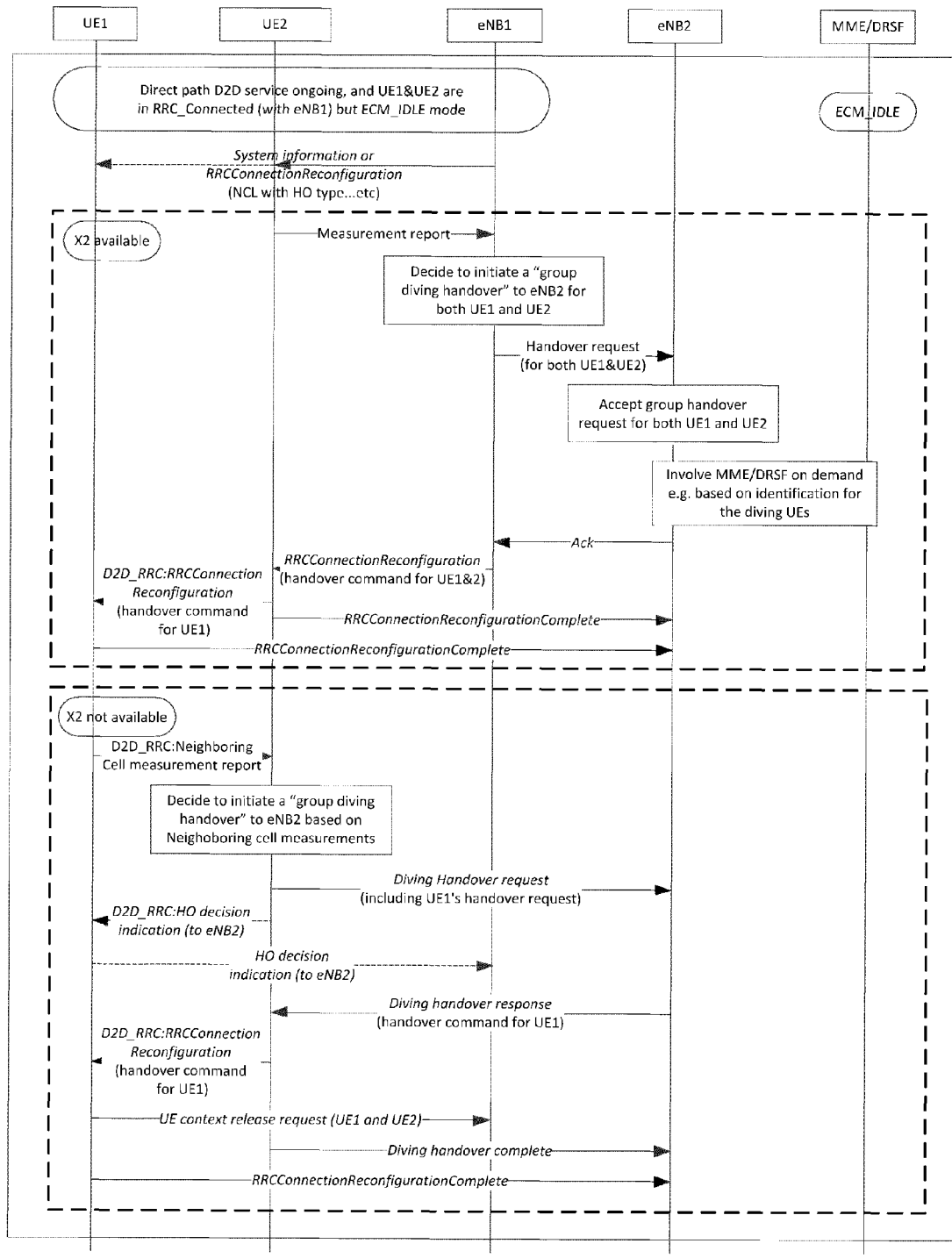
FIG. 11 is a schematic diagram of an adaptive network/UE initiated diving handover procedure for direct data path D2D according to exemplary embodiments of the present invention.

FIG. 11 is a schematic diagram of an adaptive network/UE initiated diving handover procedure for direct data path D2D according to exemplary embodiments of the present invention.

For a direct path D2D pair, the two UEs are close to each other and the measurement evaluation and measurement report may be shared for this D2D pair when applied. According to exemplary embodiments of the present invention, for direct path D2D UEs, a separate D2D radio resource control (RRC) layer may be implemented to manage the direct path (UE1⇔UE2) which is independent from the conventional RRC layer between UE and eNB. In view of the above, the D2D pair may be handed over together to a target eNB according to exemplary embodiments of the present invention.

According to the exemplary radio handover procedure illustrated in FIG. 11, UE1 and UE2 are maintaining a D2D service data path via direct link, and both UEs are in RRC_Connected mode (but ECM_IDLE mode) with eNB1 for network controlling.

According to exemplary embodiments of the present invention, eNB1 may in advance configure D2D UEs with enhanced neighbor cell list (NCL) information (via either broadcasted system information or dedicated control signaling e.g. measurement-control signaling), which may also inform UEs of the X2 interface availability towards surrounding eNBs in the configured NCL. For example, a indication bit may be added to indicate for each of neighbor cells in the NCL on the handover type to be adopted, i.e. UE initiated handover or network initiated handover (based on whether X2 interface to the respective neighbor cell (target) eNB is available or not).

Based on the NCL configured by eNB1 and negotiation results between UE1 and UE2, either network initiated or UE initiated handover may be triggered.

Namely, if X2 interface is available between eNB1 and eNB2, network initiated handover may be adopted.

In the network initiated handover according to exemplary embodiments of the present invention, a UE (e.g. UE2) sends measurement report to eNB1, and eNB1 decides to initiate a group diving handover to eNB2 for both UEs (UE1 and UE2) based on the measurement results.

It is noted that both UEs may send a separate measurement report to eNB1 or alternatively one UE (either UE1 or UE2) may send a coordinated measurement report (representing the measurement results of UE1 and UE2) to eNB1.

Subsequently, eNB1 sends a handover request message (contains handover request for both UE1 and UE2) to eNB2. The eNB2 then decides to accept the request and reply with an ACK (including a handover command for both UE1 and UE2) to eNB1.

According to exemplary embodiments of the present invention, the eNB2 may optionally determine whether to involve MME/DRSF or not during this handover procedure. For example, in case the diving UE1 could not be identified in eNB2, involvement of DRSF is needed here.

Subsequently, eNB1 sends a handover command message to UE2 (to execute the radio handover for UE2). The handover command message may (for example if the previous measurement report is a coordinated one reported by one UE (e.g. UE2) only) comprise (contained) the handover command for UE1 (e.g. put into a container transparent to UE2), which is relayed to UE1 by UE2 via the D2D message like RRC message between them. Alternatively, the handover command may (for example if the previous measurement report is sent by both UEs separately) be issued to both UEs independently from network side.

Both UE1 and UE2 may complete the radio handover by sending for example RRCConnectionReconfigurationComplete message to target eNB2.

On the other hand, if X2 interface is not available between eNB1 and eNB2, UE initiated handover may be adopted.

In the UE initiated handover according to exemplary embodiments of the present invention, UE1 sends a measurement report of neighbor cell to UE2 (via for example D2D RRC). UE2 determines a common target cell (e.g. eNB2) based on the measurement reports (i.e. based on its own measurement result/report and the measurement report/result from UE1), and subsequently triggers the diving group handover to e.g. eNB2.

The diving handover request according to exemplary embodiments of the present invention is utilized to establish a radio connection only (via random access channel (RACH)), and no EPS association is needed. The diving handover request (of UE2) may contain the handover request information of UE1 and a direct D2D link (of the D2D connection between UE1 and UE2) to allow eNB2 to make handover preparation for UE1 and direct D2D link as well.

Optionally, the UE2 may indicate to UE1 (via for example D2D RRC) that a handover decision has occurred and is informed to eNB2, and UE1 may indicate this handover decision to eNB1, such that eNB1 may suspend any further operation (e.g. packet scheduling) for UE2.

Subsequently, eNB2 replies UE2 with a diving handover response including handover command for UE1. The UE2 may relay the handover command to UE1 (via for example D2D RRC) to execute handover procedure. Before the radio handover of UE1 is executed, UE1 may indicate to eNB1 to release the context information for UE1 and UE2, and eNB1 may release the two UEs' context when a pre-defined timer expires (to support UEs' fallback in case of handover failure). After the handover, both UE1 and UE2 access to eNB2.

Finally, according to the above mentioned exemplary diving radio handover procedure according to exemplary embodiments of the present invention, both UE1 and UE2 are handed over to eNB2, while direct data path is maintained between UE1 and UE2 contrary to solutions according to exemplary embodiments of the present invention mentioned beforehand, where only one UE (UE2) is handed over to target eNB, while the other UE (UE1) remains with the original eNB.

According to exemplary embodiments of the present invention, a new handover type is introduced to support mobility procedures for both optimized path and direct path D2D pairs. Any one of the above aspects enables reduction of CN involvement during the handover as much as possible in order to avoid unnecessary participation of CN nodes, for example MME/DRSF. Accordingly, the CN burden can be relieved from D2D specific mobility signaling, since the D2D information update procedure is only triggered on demand, based on the judgment and necessity of target eNB.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 12:
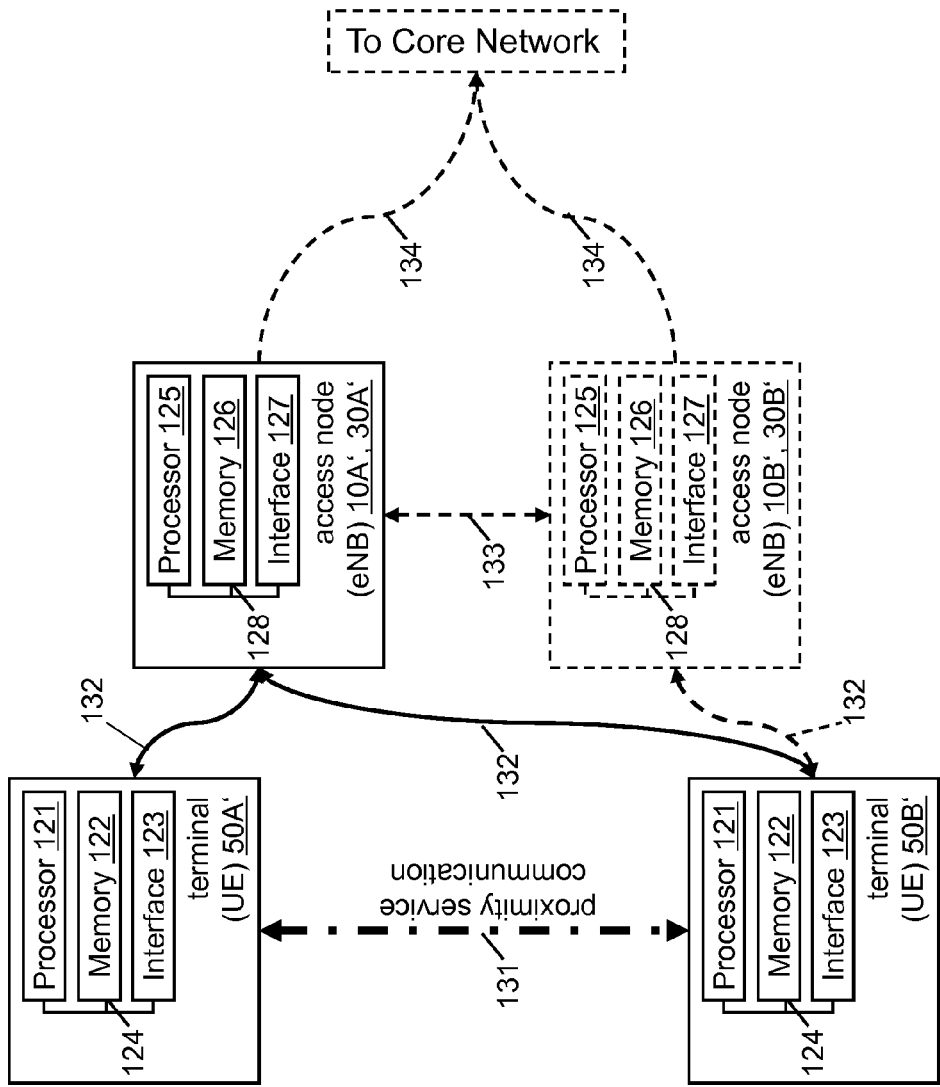
FIG. 12 is a block diagram alternatively illustrating apparatuses according to exemplary embodiments of the present invention.

In FIG. 12, an alternative illustration of apparatuses according to exemplary embodiments of the present invention is depicted. As indicated in FIG. 12, according to exemplary embodiments of the present invention, the apparatus (terminal) 50A', 50B' (corresponding to the terminal 50) comprises a processor 121, a memory 122 and an interface 123, which are connected by a bus 124 or the like.

Further, according to exemplary embodiments of the present invention, the apparatus (access node) 10A', 30A', 10B', 30B' (corresponding to the access node 10, 30) comprises a processor 125, a memory 126 and an interface 127, which are connected by a bus 128 or the like, and the apparatuses may be connected via links 131 (e.g. D2D data path), 132, 133 (e.g. X2 interface), and 134 (e.g. connection to core network), respectively.

The processor 121/125 and/or the interface 123/127 may also include a modem or the like to facilitate communication over a (hardwire or wireless) link, respectively. The interface 123/127 may include a suitable transceiver coupled to one or more antennas or communication means for (hardwire or wireless) communications with the linked or connected device(s), respectively. The interface 123/127 is generally configured to communicate with at least one other apparatus, i.e. the interface thereof.

The memory 122/126 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/ or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the access node 10 comprises at least one processor 125, at least one memory 126 including computer program code, and at least one interface 127 configured for communication with at least another apparatus. The processor (i.e. the at least one processor 125, with the at least one memory 126 and the computer program code) is configured to perform receiving a radio handover request message indicating that a radio handover of at least one communication endpoint utilizing device-to-device communication is to be hidden from core network (thus the apparatus comprising corresponding means for receiving), and to perform determining, based on device-to-device context information, which is information on said device-to-device communication, and/or based on information on said at least one communication endpoint, whether a notification of said radio handover is to be transmitted (thus the apparatus comprising corresponding means for determining).

According to exemplary embodiments of the present invention, an apparatus representing the access node 30 comprises at least one processor 125, at least one memory 126 including computer program code, and at least one interface 127 configured for communication with at least another apparatus. The processor (i.e. the at least one processor 125, with the at least one memory 126 and the computer program code) is configured to perform providing at least one communication endpoint utilizing device-to-device communication with enhanced neighbor cell list information (the enhanced neighbor cell list information may comprise at least one of a neighbor cell list listing neighbor cells, and information regarding X2 interface availability with each of said neighbor cells, thus the apparatus comprising corresponding means for providing).

According to exemplary embodiments of the present invention, an apparatus representing the terminal 50 comprises at least one processor 121, at least one memory 122 including computer program code, and at least one interface 123 configured for communication with at least another apparatus. The processor (i.e. the at least one processor 121, with the at least one memory 122 and the computer program code) is configured to perform executing device-to-device communication with a communication endpoint (thus the apparatus comprising corresponding means for executing), to perform receiving a result of reception measurement of said neighbor cell by said communication endpoint (thus the apparatus comprising corresponding means for receiving), to perform measuring said reception of said neighbor cell (thus the apparatus comprising corresponding means for measuring), and to perform deciding to initiate a radio handover to said neighbor cell based on a result of said measuring and said received result, if a X2 interface is not available between a serving cell and said neighbor cell (thus the apparatus comprising corresponding means for deciding).

For further details regarding the operability/functionality of the individual apparatuses, reference is made to the above description in connection with any one of FIGS. 1 to 11, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for mobility management for device-to-device communications. Such measures exemplarily comprise receiving a radio handover request message indicating that a radio handover of at least one communication endpoint utilizing device-to-device communication is to be hidden from core network, and determining, based on device-to-device context information, which may be information on said device-to-device communication, and/or based on information on said at least one communication endpoint, whether a notification of said radio handover is to be transmitted.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3$^{rd}$ Generation Partnership Project
ACK acknowledgment
CN core network
D2D device-to-device
DRSF D2D registration server function
eNB evolved Node B
EPS evolved packed system
HO handover
HSS home subscriber server
LTE-A Long Term Evolution Advanced
MME mobility management entity
NCL neighbor cell list
P-GW packet data network gateway
PCRF policy and charging rules function
PLMN public land mobile network
RACH random access channel
RAN radio access network
RRC radio resource control
S-GW serving gateway
UE user equipment

The invention claimed is:

1. A method comprising
receiving a radio handover request message indicating that a radio handover of at least one communication endpoint utilizing device-to-device communication is to be hidden from core network;
determining, based on device-to-device context information, which is information on said device-to-device communication, and/or on information on said at least one communication endpoint, whether a notification of said radio handover is to be transmitted;
enabling, upon determination that said notification of said radio handover is to be transmitted, transmission of a device-to-device information update request message indicative of said radio handover;
disabling, upon determination that said notification of said radio handover is not to be transmitted, said transmission of said device-to-device information update request message indicative of said radio handover;
providing at least one communication endpoint utilizing device-to-device communication with enhanced neighbor cell list information, wherein said enhanced neighbor cell list information comprises
a neighbor cell list listing neighbor cells, and
information regarding X2 interface availability with each of said neighbor cells; and
transmitting said enhanced neighbor cell list information via at least one of a system information broadcast and a dedicated control signaling.

2. The method according to claim 1, wherein in relation to said determining,
said notification of said radio handover is not to be transmitted, if at least:
a device-to-device registration area of said at least one communication endpoint has not changed,
said at least one communication endpoint can be identified, and
no involvement of a core network is needed in a security/ciphering key update for said at least one communication endpoint.

3. The method according to claim 1, wherein
said device-to-device context information comprises at least one of a device-to-device pair identifier, a X2 application protocol identifier, a device-to-device service bearer list, and device-to-device location registration information.

4. A method comprising
executing device-to-device communication with a communication endpoint,
receiving a result of reception measurement of a neighbor cell by said communication endpoint,
measuring said reception of said neighbor cell, and
deciding to initiate a radio handover to said neighbor cell based on a result of said measuring and said received result, upon detecting that a X2 interface is not available between a serving cell and said neighbor cell.

5. The method according to claim 4, further comprising
obtaining enhanced neighbor cell list information from said serving cell,
wherein said obtaining comprises
receiving said enhanced neighbor cell list information via at least one of a system information broadcast and a dedicated control signaling,
wherein said enhanced neighbor cell list information comprises
a neighbor cell list listing neighbor cells of said serving cell, and
information regarding X2 interface availability of said serving cell with each of said neighbor cells.

6. The method according to claim 5, further comprising
determining, based on said enhanced neighbor cell list information, whether an X2 interface is available between said serving cell and said neighbor cell.

7. The method according to claim 5, further comprising
transmitting, upon decision to initiate said radio handover to said neighbor cell, a radio handover request message to said neighbor cell, said radio handover request message comprising an own radio handover request, a radio handover request for said communication endpoint, and information on a direct device-to-device link of said device-to-device communication.

8. The method according to claim 7, wherein said radio handover request message is indicative of that said radio handover is to be hidden from a core network.

9. The method according to claim 7, further comprising
transmitting a device-to-device radio resource control related handover decision indication message, wherein said device-to-device radio resource control related handover decision indication message indicates an initiated radio handover to said neighbor cell.

10. The method according to claim 7, further comprising
receiving, from said neighbor cell, as a response to said radio handover request message, a radio handover response message comprising a radio handover command to be considered and a radio handover command for said communication endpoint; and
transmitting a device-to-device radio resource control related message comprising said radio handover command for said communication endpoint.

11. The method according to claim 4, further comprising
receiving a device-to-device radio resource control related handover decision indication message indicating initiated radio handover to said neighbor cell;
transmitting, to said serving cell, a handover decision indication message indicating initiated radio handover to said neighbor cell, if said X2 interface is not available between said serving cell and said neighbor cell.

12. The method according to claim 11, further comprising
transmitting a context release request message requesting context release for oneself and said communication endpoint.

13. A computer program product comprising at least one non-transitory computer-readable storage medium, the non-transitory computer-readable storage medium comprising a set of instructions which, when executed by one or more processors, cause an apparatus to at least perform the method according to claim 1.

14. An apparatus comprising:
at least one processor; and
at least one memory including a computer program code, wherein the at least one memory and the computer program code are configured, with the at least one processor, to cause the apparatus to:
receive a radio handover request message indicating that a radio handover of at least one communication endpoint utilizing device-to-device communication is to be hidden from core network;
determine, based on device-to-device context information, which is information on said device-to-device communication, and/or on information on said at least one communication endpoint, whether a notification of said radio handover is to be transmitted;
enable, upon determination that said notification of said radio handover is to be transmitted, transmission of a device-to-device information update request message indicative of said radio handover;
disable, upon determination that said notification of said radio handover is not to be transmitted, said transmission of said device-to-device information update request message indicative of said radio handover;
provide at least one communication endpoint utilizing device-to-device communication with enhanced neighbor cell list information, wherein said enhanced neighbor cell list information comprises
a neighbor cell list listing neighbor cells, and information regarding X2 interface availability with each of said neighbor cells; and
transmit said enhanced neighbor cell list information via at least one of a system information broadcast and a dedicated control signaling.

15. The apparatus of claim 14, wherein said notification of said radio handover is not to be transmitted, if at least:
a device-to-device registration area of said at least one communication endpoint has not changed,
said at least one communication endpoint can be identified, and
no involvement of a core network is needed in a security/ciphering key update for said at least one communication endpoint.

16. The apparatus of claim 14, wherein said device-to-device context information comprises at least one of a device-to-device pair identifier, a X2 application protocol identifier, a device-to-device service bearer list, and device-to-device location registration information.

17. The apparatus according to claim 14, wherein the apparatus comprises at least one of a base station, an access node of a cellular system, an access node of an LTE system and an access node of an LTE-A cellular system.

18. An apparatus comprising:
at least one processor; and
at least one memory including a computer program code, wherein the at least one memory and the computer program code are configured, with the at least one processor, to cause the apparatus to:
provide at least one communication endpoint utilizing device-to-device communication with enhanced neighbor cell list information, wherein said enhanced neighbor cell list information comprises
a neighbor cell list listing neighbor cells, and information regarding X2 interface availability with each of said neighbor cells; and
transmit said enhanced neighbor cell list information via at least one of a system information broadcast and a dedicated control signaling.

19. The apparatus according to claim 18, wherein
the apparatus is operable as or at a base station or access node of a cellular system, and/or
the apparatus is operable in at least one of a LTE and a LTE-A cellular system.

20. An apparatus comprising:
at least one processor; and
at least one memory including a computer program code, wherein the at least one memory and the computer program code are configured, with the at least one processor, to cause the apparatus to:
execute device-to-device communication with a communication endpoint,
receive a result of reception measurement of a neighbor cell by said communication endpoint,
measure said reception of said neighbor cell, and
decide to initiate a radio handover to said neighbor cell based on a result of said measuring and said received result, upon detecting that a X2 interface is not available between a serving cell and said neighbor cell.

21. The apparatus according to claim 20, wherein the at least one memory and the computer program code are configured, with the at least one processor, to cause the apparatus to:
obtain enhanced neighbor cell list information from said serving cell,
wherein said to obtain comprises to
receive said enhanced neighbor cell list information via at least one of a system information broadcast and a dedicated control signaling,
wherein said enhanced neighbor cell list information comprises a neighbor cell list listing neighbor cells of said serving cell, and
information regarding X2 interface availability of said serving cell with each of said neighbor cells.

22. The apparatus according to claim 20, wherein the at least one memory and the computer program code are configured, with the at least one processor, to cause the apparatus to:
determine, based on said enhanced neighbor cell list information, whether an X2 interface is available between said serving cell and said neighbor cell.

23. The apparatus according to claim 20, wherein the at least one memory and the computer program code are configured, with the at least one processor, to cause the apparatus to:
transmit, upon decision to initiate said radio handover to said neighbor cell, a radio handover request message to said neighbor cell, said radio handover request message comprising an own radio handover request, a radio handover request for said communication endpoint, and information on a direct device-to-device link of said device-to-device communication.

24. The apparatus according to claim 20, wherein said radio handover request message is indicative of that said radio handover is to be hidden from a core network.

25. The apparatus according to claim 20, wherein the at least one memory and the computer program code are configured, with the at least one processor, to cause the apparatus to:
transmit a device-to-device radio resource control related handover decision indication message, wherein said device-to-device radio resource control related handover decision indication message indicates an initiated radio handover to said neighbor cell.

26. The apparatus according to claim 20, wherein the at least one memory and the computer program code are configured, with the at least one processor, to cause the apparatus to:
receive, from said neighbor cell, as a response to said radio handover request message, a radio handover response message comprising a radio handover command to be considered and a radio handover command for said communication endpoint; and
transmit a device-to-device radio resource control related message comprising said radio handover command for said communication endpoint.

27. The apparatus according to claim 20, wherein the at least one memory and the computer program code are configured, with the at least one processor, to cause the apparatus to:
receive a device-to-device radio resource control related handover decision indication message indicating initiated radio handover to said neighbor cell;
transmit, to said serving cell, a handover decision indication message indicating initiated radio handover to said neighbor cell, if said X2 interface is not available between said serving cell and said neighbor cell.

28. The apparatus according to claim 20, wherein the at least one memory and the computer program code are configured, with the at least one processor, to cause the apparatus to:
transmit a context release request message requesting context release for oneself and said communication endpoint.

29. The apparatus according to claim 20, wherein
the apparatus is operable as or at a terminal, user equipment, mobile station or modem, and/or
the apparatus is operable in at least one of a LTE and a LTE-A cellular system.

* * * * *